(12) United States Patent
Braicks (10) Patent No.: US 8,047,770 B2
(45) Date of Patent: Nov. 1, 2011

(54) METHODS AND SYSTEMS FOR PROVIDING VARIABLE MECHANICAL BRAKE TORQUE

(75) Inventor: Axel Braicks, Salzbergen (DE)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 12/649,989

(22) Filed: Dec. 30, 2009

(65) Prior Publication Data
US 2011/0135465 A1 Jun. 9, 2011

(51) Int. Cl.
*F03D 7/04* (2006.01)
(52) U.S. Cl. .......................... 415/123; 416/32
(58) Field of Classification Search ............... 415/122.1, 415/123; 416/32
See application file for complete search history.

(56) References Cited

U.S. PATENT DOCUMENTS

6,254,197 B1 * 7/2001 Lading et al. ..................... 303/2
2010/0329867 A1 * 12/2010 Patel et al. ................ 416/169 R
* cited by examiner

*Primary Examiner* — Edward Look
*Assistant Examiner* — Dwayne J White
(74) *Attorney, Agent, or Firm* — James McGinness, Esq.; Armstrong Teasdale LLP (57) ABSTRACT

A brake system is provided for controlling a rotational speed of a drivetrain for a wind turbine. The drivetrain is coupled to a rotor shaft and a generator rotor shaft. The brake system includes a mechanical brake operatively coupled to the drivetrain. The mechanical brake includes a brake caliper and a brake disc coupled to the drivetrain. A sensor is configured to detect a parameter of the wind turbine. A controller is configured to actuate the brake caliper to apply a braking force on the brake disc. The controller is configured to control the mechanical brake based on the parameter to adjust a brake torque generated by the braking force.

20 Claims, 5 Drawing Sheets

METHODS AND SYSTEMS FOR PROVIDING VARIABLE MECHANICAL BRAKE TORQUE

BACKGROUND OF THE INVENTION

The subject matter described herein relates generally to wind turbines and, more particularly, to methods and systems for providing a variable mechanical brake torque to brake discs of wind turbines.

Wind turbines have been receiving increased attention for being environmentally safe and relatively inexpensive alternative energy sources. With the growing interest in alternative energy sources, considerable efforts have been made to develop wind turbines that are reliable and efficient.

At least some wind turbines include a plurality of rotor blades coupled to a drivetrain via a rotor. Some drivetrains include a gearbox that facilitates increasing and/or decreasing a torque of the rotor. Some gearboxes include a brake system that facilitates reducing a speed of the rotor. More specifically, a brake caliper applies a force against at least one side of a brake disc, which is coupled to the rotor, creating friction and causing the brake disc to slow and/or stop. A brake torque, which represents a power of the brake system, may be calculated by multiplying the force applied by the brake caliper by a distance from the point of applied force to a hub center.

At least some known mechanical brake systems are capable of applying only one high constant brake torque onto the brake disc. Repeated and/or extended applications of a high constant brake torque may damage the rotor and/or the gearbox, ultimately influencing a reliability of the rotor, the gearbox, and/or the drivetrain.

BRIEF SUMMARY OF THE INVENTION

In one aspect, a method is provided for controlling a rotational speed of a drivetrain for a wind turbine. The drivetrain is coupled to a rotor shaft and a generator rotor shaft. A mechanical brake is operatively coupled to the drivetrain. The mechanical brake includes a brake caliper and a brake disc coupled to the drivetrain. The brake caliper is actuated to apply a braking force on the brake disc. The braking force generates a brake torque exerted by the brake system. A parameter of the wind turbine is detected. An operating command is determined based on the parameter. The mechanical brake is controlled based on the operating command. The operating command selectively adjusts the brake torque exerted by the brake system.

In another aspect, a brake system is provided for controlling a rotational speed of a drivetrain for a wind turbine. The drivetrain is coupled to a rotor shaft and a generator rotor shaft. The brake system includes a mechanical brake operatively coupled to the drivetrain. The mechanical brake includes a brake caliper and a brake disc coupled to the drivetrain. A sensor is configured to detect a parameter of the wind turbine. A controller is configured to actuate the brake caliper to apply a braking force on the brake disc. The controller is configured to control the mechanical brake based on the parameter to selectively adjust a brake torque generated by the braking force.

In yet another aspect, a wind turbine is provided. The wind turbine includes a rotor, a drivetrain, and a rotor shaft coupling the rotor to the drivetrain. The wind turbine further includes a generator and a generator rotor shaft coupling the generator to the drivetrain. A mechanical brake is operatively coupled to the drivetrain. The mechanical brake includes a brake caliper and a brake disc coupled to the drivetrain. A sensor is configured to detect a parameter of the wind turbine. A controller is configured to control a rotational speed of the drivetrain. The controller is configured to actuate the brake caliper to apply a braking force on the brake disc. The controller is configured to control the mechanical brake based on the parameter to selectively adjust a brake torque generated by the braking force.

DETAILED DESCRIPTION OF THE INVENTION

The methods and systems described herein provide a brake system, including a brake disc and a brake caliper, and a controller coupled to the brake system. The controller is configured to control the brake system to exert a variable brake torque to reduce a load on a drivetrain. More specifically, the controller receives a parameter and actuates the brake caliper to slow and/or stop a rotation of the brake disc based on the received parameter. The brake torque is controlled by adjusting at least one of a force applied by the brake caliper, an angle of force applied by the brake caliper, and a distance from the point of applied force to a hub of the brake disc.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy.

Figure 1:
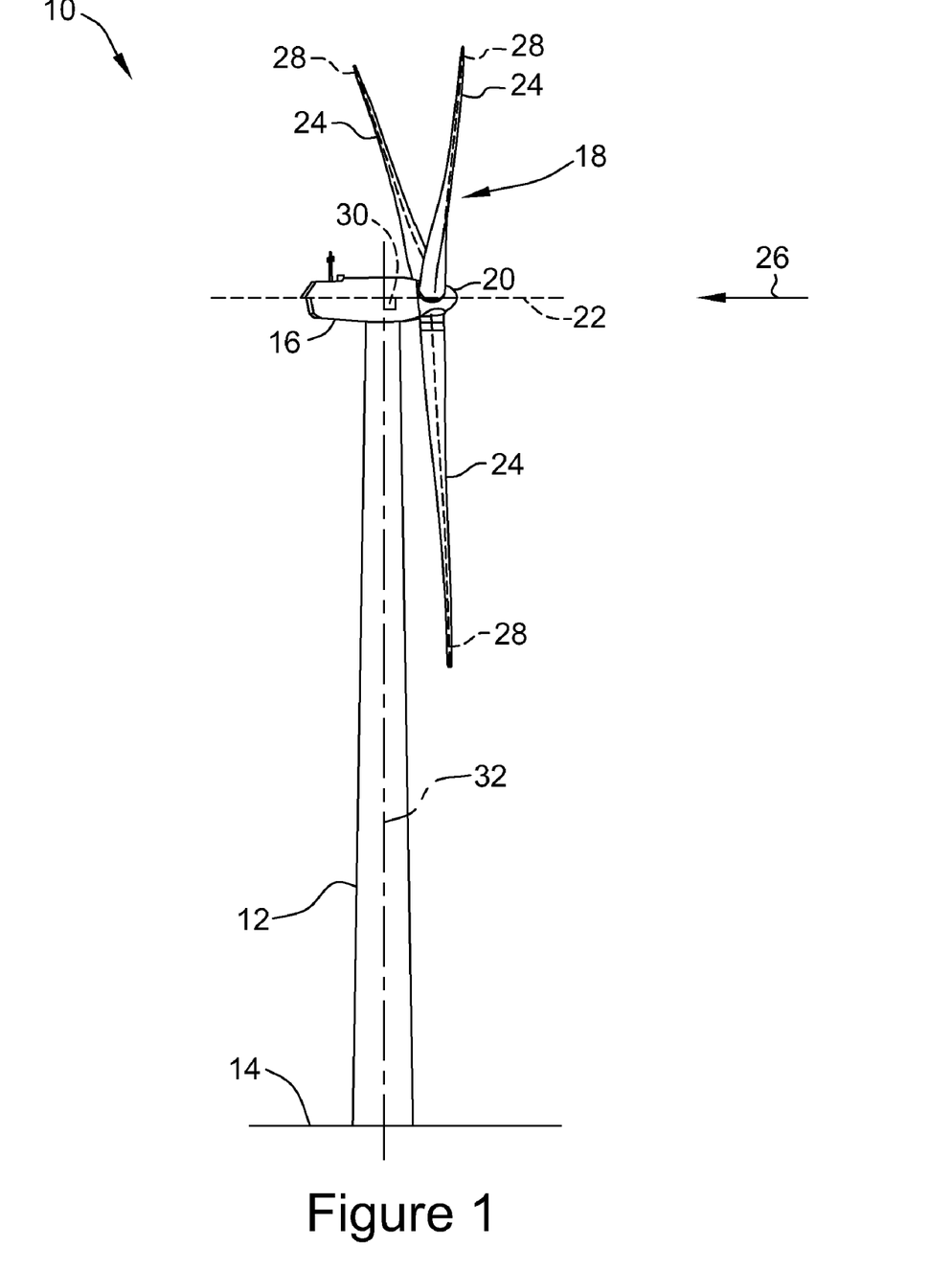
FIG. 1 is a perspective view of an exemplary wind turbine.

FIG. 1 is a perspective view of an exemplary wind turbine 10. In the exemplary embodiment, wind turbine 10 generates electrical power from wind energy. Wind turbine 10 has a tilt angle suitable for wind turbine 10 to function as described herein. In the exemplary embodiment, wind turbine 10 is a substantially horizontal wind turbine.

In the exemplary embodiment, wind turbine 10 includes a tower 12 that extends from a supporting surface 14, a nacelle 16 mounted on tower 12, and a rotor 18 that is coupled to nacelle 16. Tower 12 is a suitable type of tower fabricated from a suitable material. In the exemplary embodiment, tower 12 is fabricated from tubular steel such that a cavity (not shown in FIG. 1) is defined between supporting surface 14 and nacelle 16. Tower 12 has a height suitable to enable wind turbine 10 to function as described herein.

In the exemplary embodiment, rotor 18 includes a hub 20 rotatable about an axis of rotation 22 and at least one rotor blade 24 coupled to and extending outwardly from hub 20. Rotor 18 includes a number of rotor blades 24 suitable to enable wind turbine 10 to function as described herein. In the exemplary embodiment, rotor 18 includes three rotor blades 24. In the exemplary embodiment, rotor blades 24 are spaced about hub 20 to facilitate rotating rotor 18, thereby transferring kinetic energy from the wind into usable mechanical energy, and subsequently, electrical energy.

Each rotor blade 24 has a length, shape, configuration, and/or orientation suitable to enable wind turbine 10 to function as described herein. In the exemplary embodiment, rotor blades 24 have a length ranging from about 0.5 meters (m) to about 91 m. Alternatively, other non-limiting examples of blade lengths include 10 m or less, 20 m, 37 m, or a length that is greater than 91 m. In the exemplary embodiment, rotor 18 generally faces upwind and/or downwind to harness wind energy. More specifically, in the exemplary embodiment, as wind strikes rotor blades 24 from a direction 26, rotor 18 is rotated about axis of rotation 22.

In the exemplary embodiment, as rotor blades 24 are rotated and subjected to centrifugal forces, rotor blades 24 are also subjected to various forces and moments. As such, rotor blades 24 may deflect and/or rotate from a neutral, or non-deflected, position to a deflected position. A pitch angle of rotor blades 24, i.e., an angle that determines a perspective of rotor blades 24 with respect to direction 26 of the wind, may be rotated about a respective pitch axis 28 to control power generated by wind turbine 10. In the exemplary embodiment, the pitch angle of each rotor blade 24 is controlled using a controller 30.

In the exemplary embodiment, controller 30 is shown as being centralized within nacelle 16. Alternatively, controller 30 may be a distributed system throughout wind turbine 10, on supporting surface 14, and/or at a remote control center. In the exemplary embodiment, controller 30 is communicatively coupled to a plurality of the components of wind turbine 10 for generally monitoring and controlling operation of wind turbine 10. For example, in the exemplary embodiment, as direction 26 changes, a yaw direction of nacelle 16 may be controlled about a yaw axis 32 to position rotor blades 24 with respect to direction 26. Moreover, controller 30 may be used to monitor and control the overall system including, without limitation, pitch and speed regulation, high-speed shaft and yaw brake application, yaw and pump motor application, and/or fault monitoring. Alternative distributed or centralized control architectures may be used in certain embodiments. Controller 30 is described in further detail below.

Figure 2:
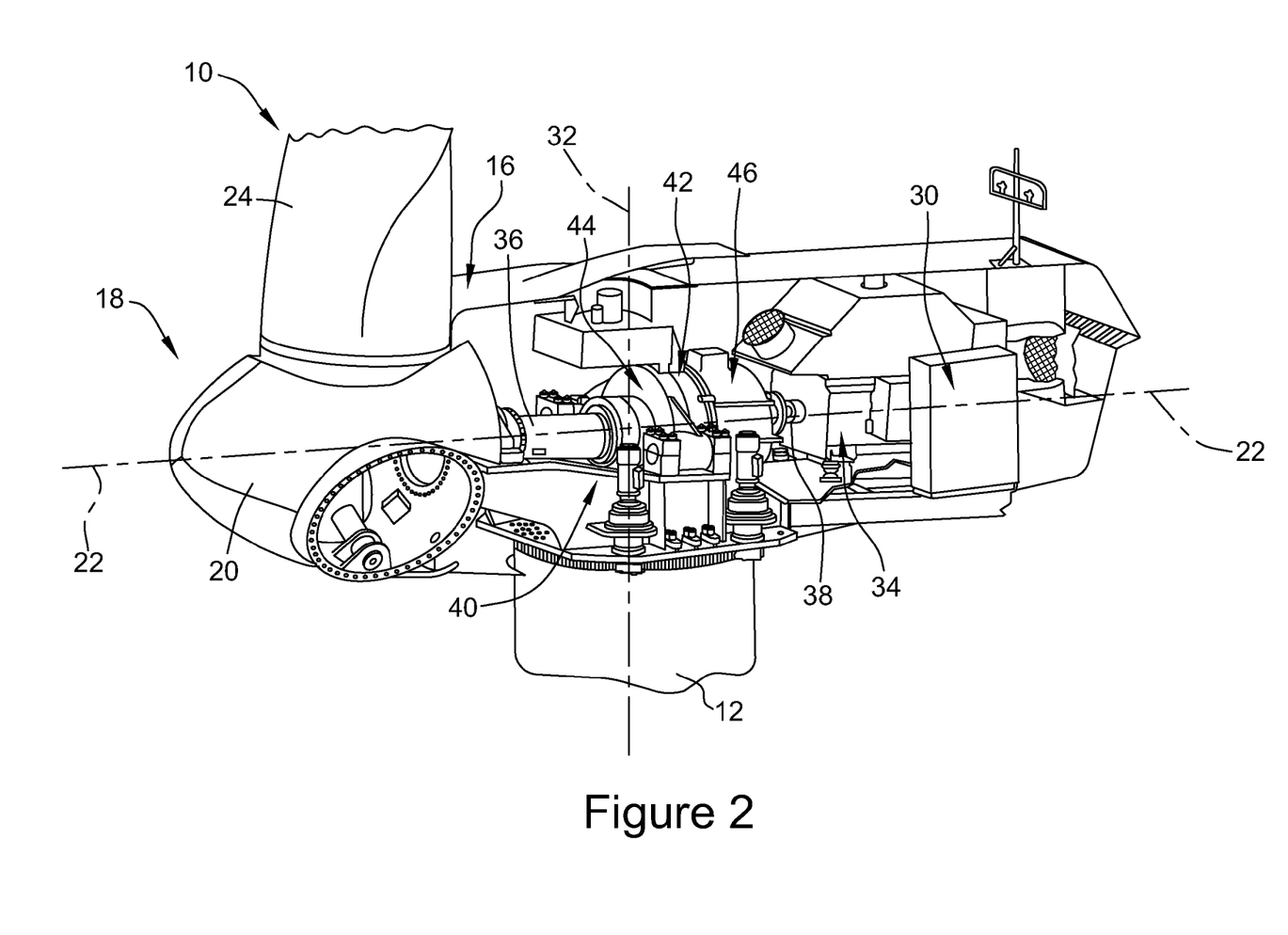
FIG. 2 is a perspective partial cross-sectional view of an exemplary nacelle suitable for use with the wind turbine shown in FIG. 1.

Referring now to FIG. 2, wind turbine 10 includes an electrical generator 34 coupled to rotor 18 for generating electrical power from the rotational energy generated by rotor 18. In the exemplary embodiment, rotor 18 includes a rotor shaft 36 coupled to hub 20 for rotation therewith. In the exemplary embodiment, a generator rotor shaft 38 is rotatably coupled to rotor shaft 36 through a drivetrain 40 including a gearbox 42 having a low speed side 44 rotatably coupled to rotor shaft 36 and a high speed side 46 rotatably coupled to generator rotor shaft 38.

Figure 3:
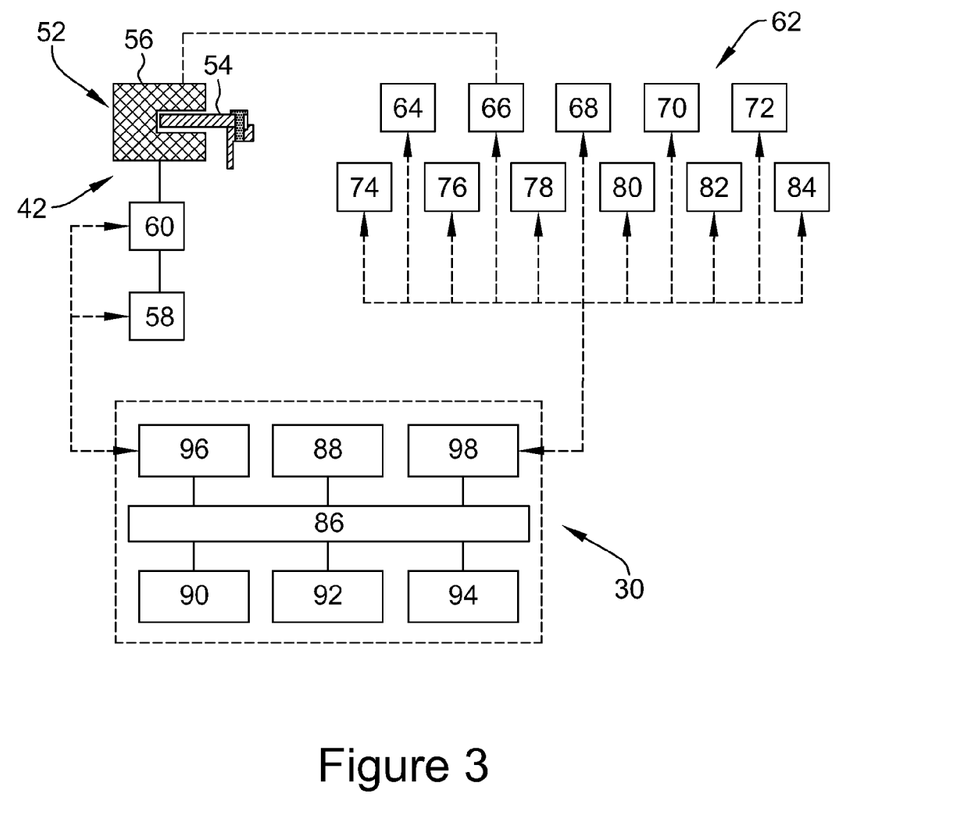
FIG. 3 is a schematic view of the wind turbine shown in FIG. 1.

Referring now to FIG. 3, gearbox 42 includes a brake system 52 that facilitates slowing and/or stopping the rotation of rotor 18 and/or electrical generator 34. In the exemplary embodiment, brake system 52 is a mechanical brake and includes a brake disc 54 and at least one brake caliper 56 coupled to brake disc 54. Brake caliper 56 is configured to receive at least a portion of brake disc 54. Brake system 52 may include any suitable brake system including, without limitation, a mechanical brake system, a hydraulic brake system, a pneumatic brake system, and an electromagnetic brake system.

In the exemplary embodiment, brake caliper 56 is suitably coupled to a first valve 58 and a second valve 60. In the exemplary embodiment, first valve 58 and second valve 60 are coupled in serial arrangement. In the exemplary embodiment, first valve 58 cooperates with second valve 60 such that first valve 58 has a gross control of brake caliper 56 and second valve 60 has a fine control of brake caliper 56. For example, first valve 58 may be used for a general or coarse change in brake system 52, and second valve 60 may be used for a delicate or subtle change in brake system 52. In the exemplary embodiment, controller 30 is operatively coupled to first valve 58 and second valve 60 for operating first valve 58 and/or second valve 60. In a particular embodiment, controller 30 is configured to independently control first valve 58 and/or second valve 60. In the exemplary embodiment, first valve 58 and second valve 60 are hydraulic valves. Alternatively, first valve 58 and second valve 60 may include any suitable valve including, without limitation, mechanical valves, pneumatic valves, and/or electromagnetic valves.

Wind turbine 10 includes a plurality of sensors 62 coupled to one or more components of wind turbine 10 and/or the electrical load for measuring parameters of such components and/or measuring other ambient conditions. Sensors 62 may include, without limitation, one or more sensors configured to measure any ambient condition, any operational parameter of any wind turbine component, displacement, yaw, pitch, moments, strain, stress, twist, damage, failure, rotor torque, rotor speed, an anomaly in the electrical load, and/or an anomaly of power supplied to any component of wind turbine 10. Sensors 62 may be operatively coupled to any component of wind turbine 10 and/or the electrical load at any location thereof for measuring any parameter thereof, whether such component, location, and/or parameter is described and/or shown herein, and may be used to derive other measurements, e.g., viscosity, as known in the art. In the exemplary embodiment, each sensor 62 is coupled in electronic data communication to controller 30 for transmitting one or more suitable signals to controller 30 for processing and/or receiving suitable signals from controller 30.

In the exemplary embodiment, sensors 62 include any suitable sensor or combination of sensors including, without limitation the following sensors: a power sensor 64 operatively coupled to electrical generator 34 for detecting an electrical power output of electrical generator 34; a brake sensor 66 operatively coupled to brake system 52 for detecting a brake torque exerted by brake system 52; a rotor shaft sensor 68 operatively coupled to rotor shaft 36 for detecting a speed of rotation of rotor shaft 36 and/or a torque of rotor shaft 36; a generator rotor shaft sensor 70 operatively coupled to generator rotor shaft 38 for detecting a speed of rotation of generator rotor shaft 38 and/or a torque of generator rotor shaft 38; at least one angle sensor 72 operatively coupled to a corresponding rotor blade 24 for detecting a pitch angle of the corresponding rotor blade 24 with respect to wind direction 26 and/or with respect to hub 20; a yaw sensor 74 operatively coupled to a suitable location within or remote to wind turbine 10, such as nacelle 16, for detecting a yaw orientation of nacelle 16; a frequency sensor 76 operatively coupled to drivetrain 40 for detecting a frequency and/or an eigenfrequency of drivetrain 40; an anemometer 78 operatively coupled to a suitable location within or remote to wind turbine 10, such as nacelle 16, for detecting a plurality of wind conditions including, without limitation, wind direction, wind velocity, wind shear, wind gradient, and turbulence intensity; a barometric pressure sensor 80 operatively coupled to a suitable location within or remote to wind turbine 10, such as nacelle 16, for detecting an ambient air pressure; a temperature sensor 82 operatively coupled to a suitable location within or remote to wind turbine 10, such as nacelle 16, for detecting an ambient air temperature; and a relative humidity sensor 84 operatively coupled to nacelle 16 for detecting an ambient air humidity.

In the exemplary embodiment, power sensor 64 may include, without limitation, a Hall Effect current transducer (CTs) and/or a capacitive voltage transducer (CVTs). Moreover, in the exemplary embodiment, brake sensor 66, rotor shaft sensor 68, and generator rotor shaft sensor 70 may each include, without limitation, an optical encoder, a digital proximity sensor, a piezo-electric transducer, a strain gauge, and/or a tachometer. Further, in the exemplary embodiment, angle sensor 72 and yaw sensor 74 may include an optical encoder.

In the exemplary embodiment, controller 30 includes a bus 86 or other communications device to communicate information between various components of controller 30. In the exemplary embodiment, controller 30 includes at least one processor 88 that is coupled to bus 86 to process information, including information from sensors 62 and/or one or more other sensors. Further, other components described herein may include a processor. In the exemplary embodiment, processor 88 is configured to perform the methods and/or steps described herein. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or controller can also include memory, input channels, and/or output channels.

In the exemplary embodiment, controller 30 also includes at least one random access memory (RAM) 90 and/or other storage device 92. RAM 90 and storage device 92 are coupled to bus 86 to store and transfer information and instructions to be executed by processor 88. RAM 90 and/or storage device 92 can also be used to store temporary variables or other intermediate information during execution of instructions by processor 88. In the exemplary embodiment, controller 30 also includes at least one read only memory (ROM) 94 and/or other static storage devices coupled to bus 86 to store and provide static (i.e., non-changing) information and instructions to processor 88. In the embodiments described herein, memory may include, without limitation, a computer-readable medium, such as a RAM, and a computer-readable non-volatile medium, such as flash memory. Alternatively, a floppy disk, a compact disc-read only memory (CD-ROM), a magneto-optical disk (MOD), and/or a digital versatile disc (DVD) may also be used.

In the exemplary embodiment, controller 30 further includes at least one input/output device 96 that facilitates providing input data to controller 30 and/or providing outputs, such as, but not limited to, brake control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media and other components. In the embodiments described herein, input channels may include, without limitation, sensors and/or computer peripherals associated with an operator interface, such as a mouse and/or a keyboard. Further, in the exemplary embodiment, output channels may include, without limitation, a control device, an operator interface monitor and/or a display. In certain embodiments, hard-wired circuitry can be used in place of or in combination with software instructions. Thus, execution of sequences of instructions is not limited to any specific combination of hardware circuitry and software instructions, whether described and/or shown herein. In the exemplary embodiment, controller 30 also includes at least one sensor interface 98 that allows controller 30 to communicate with sensors 62 and/or one or more other sensors. Sensor interface 88 includes, for example, one or more analog-to-digital converters that convert analog signals into digital signals that can be used by processor 88.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, brake system control commands. The execution of sequences of instructions is not limited to any specific combination of hardware circuitry and software instructions.

Figure 4:
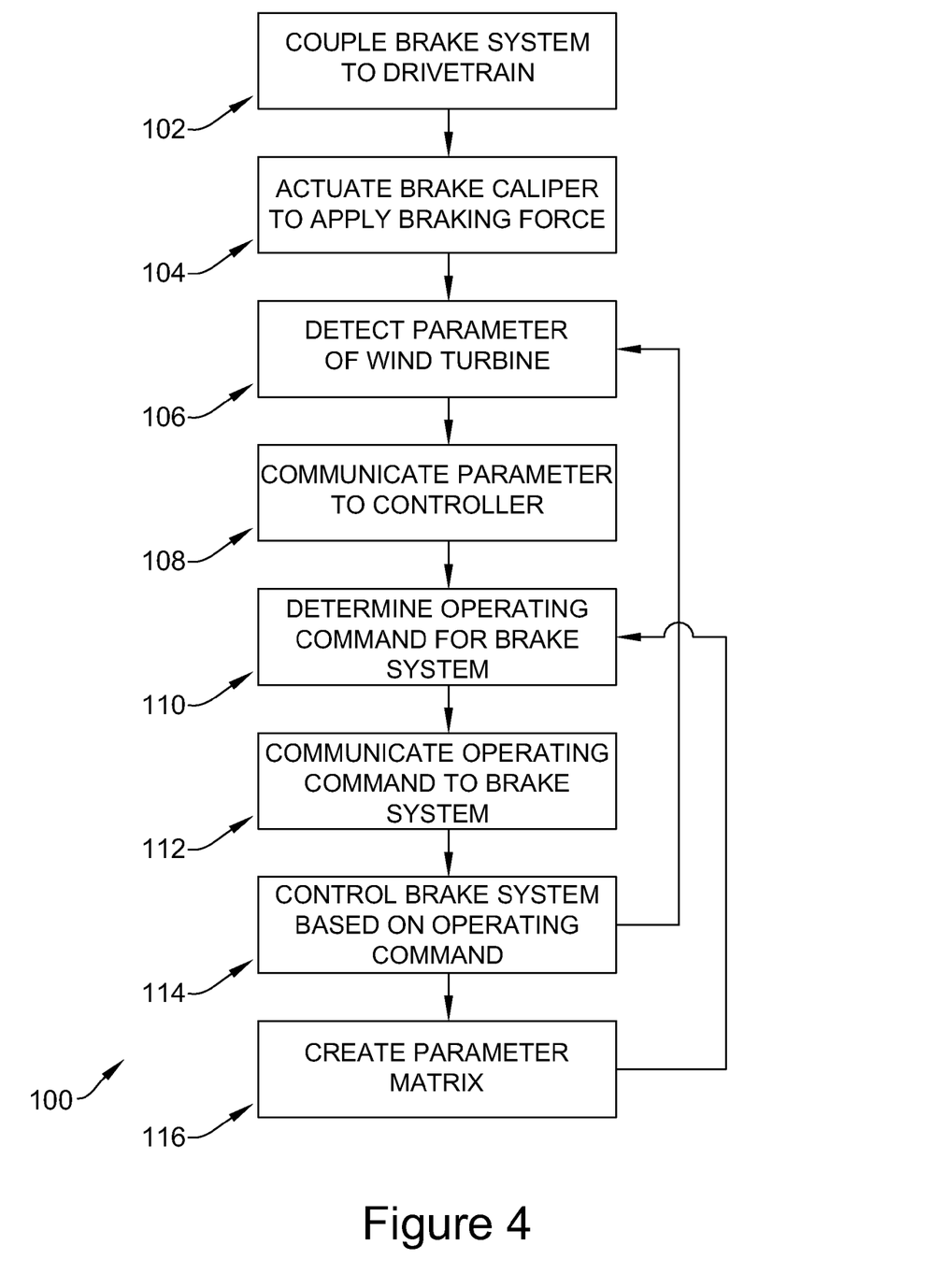
FIG. 4 is an exemplary method for operating the wind turbine shown in FIG. 1; and, FIGS. 5-7 illustrate operating characteristics of the wind turbine during implementation of the method shown in FIG. 4.

FIG. 4 is a flowchart illustrating an exemplary method 100 for controlling a rotational speed of drivetrain 40. In the exemplary embodiment, method 100 includes operatively coupling 102 brake system 52 to drivetrain 40. Brake system 52 includes brake caliper 56 and brake disc 54 coupled to drivetrain 40.

In the exemplary embodiment, brake system 52 and, more specifically, brake caliper 56 is actuated 104 to apply a braking force on brake disc 54. More specifically, in the exemplary embodiment, brake caliper 56 applies a braking force on brake disc 54 to exert the brake torque.

When brake system 52 is applied, at least one sensor 62 detects 106 a parameter of wind turbine 10 including, without limitation, the brake torque, a shaft parameter, a wind turbine parameter, and an ambient environment parameter. For example, the shaft parameter includes, without limitation, any suitable combination of a speed of rotation of rotor shaft 36, a torque of rotor shaft 36, a speed of rotation of generator rotor shaft 38, and a torque of generator rotor shaft 38. Moreover, the wind turbine parameter includes, without limitation, any suitable combination of an event notification, a pitch angle of rotor blade 24, an orientation of nacelle 16, and a frequency and/or an eigenfrequency of drivetrain 40. Further, the ambient environment parameter includes, without limitation, any suitable combination of a wind direction, a wind velocity, a wind shear, a wind gradient, a turbulence intensity, an ambient air pressure, an ambient air temperature, and an ambient air humidity. In the exemplary embodiment, parameters are detected 106 in a continuous and dynamic manner via at least one algorithm and statically stored electronically within a table (not shown) that is maintained within controller 30.

In the exemplary embodiment, sensors 62 communicate 108 the parameter with controller 30 and, more specifically, transmit a signal that indicates the detected parameter to controller 30. Controller 30 then determines 110 an operating command for brake system 52 and, more specifically, first valve 58 and second valve 60 based on communication 108. More specifically, in the exemplary embodiment, controller 30 determines 110 a first operating command for a gross control of brake system 52 and/or a second operating command for a fine control of brake system 52 based on communication 108. Controller 30 may control brake caliper 56 to increase or decrease a brake torque based on an operational change of wind turbine 10. For example, controller 30 may include a control or notch filter (not shown) that facilitates determining 110 the operating command for adjusting at least one of a force applied by brake caliper 56, an angle of force applied by brake caliper 56, and a distance from the point of applied force to a hub of brake disc 54. The notch filter may have any suitable input including, without limitation, a brake torque, a shaft parameter, a wind turbine parameter, and an ambient environment parameter.

In the exemplary embodiment, controller 30 determines 110 the operating command for brake system 52 such that the speed of rotation of rotor shaft 36 and/or generator rotor shaft 38 decreases. Additionally or alternatively, controller 30 determines 110 the operating command for brake system 52 such that the brake torque exerted by brake system 52 decreases while wind turbine 10 generates power. More specifically, in the exemplary embodiment, controller 30 determines 110 the operating command such that brake system 52 exerts a variable brake torque over a time that brake caliper 56 applies a force onto brake disc 54 without loading drivetrain 40 with a force greater than required to decrease the speed of rotation of rotor shaft 36 and/or generator rotor shaft 38.

In the exemplary embodiment, operating commands are determined 110 in a continuous and dynamic manner via at least one algorithm and statically stored electronically within a table (not shown) that is maintained within controller 30. Alternatively, such operating commands may be determined 110 dynamically using at least one algorithm.

In the exemplary embodiment, controller 30 communicates 112 the operating command with brake system 52 and, more specifically, transmits the operating command to brake system 52. In a particular embodiment, controller 30 communicates 112 the first operating command to first valve 58, and/or controller 30 communicates 112 the second operating command to second valve 60. In the exemplary embodiment, controller 30 controls 114 brake system 52 based on the operating command to control a brake torque generated by the braking force. More specifically, in the exemplary embodiment, the brake torque is controlled by adjusting at least one of a force applied by brake caliper 56, an angle of force applied by brake caliper 56, and a distance from the point of applied force to a hub of brake disc 54. More specifically, in the exemplary embodiment, first valve 58 and/or second valve 60 are controlled 114 or actuated based on the first and second operating commands, respectively, to exert a brake torque and slow and/or stop a rotation of brake disc 54.

In the exemplary embodiment, method 100 is implemented in a continuous, dynamic and/or iterative manner. For example, an initial set of operating commands may be determined for an initial set of detected parameters, and a subsequent set of operating commands may be determined for a subsequent set of detected parameters.

In the exemplary embodiment, controller 30 may create 116 a parameter matrix including a plurality of footprints associated with various detections 106. More specifically, in the exemplary embodiment, controller 30 may store a plurality of operating commands used for a plurality of detections in a database and calibrate and/or determine a subsequent operating command for brake system 52 based on the plurality of stored operating commands and/or other data associated with brake system 52.

For example, controller 30 may create 116 the parameter matrix including a first footprint associating a first combination of detections with a first operating command. When controller 30 receives a second footprint, including a second combination of detections that is similar to those of the first combination of detections, controller 30 may operate brake system 52 using the first operating command and/or calibrate operation of brake system 52 based on a comparison of the first and second footprints.

Figure 5:
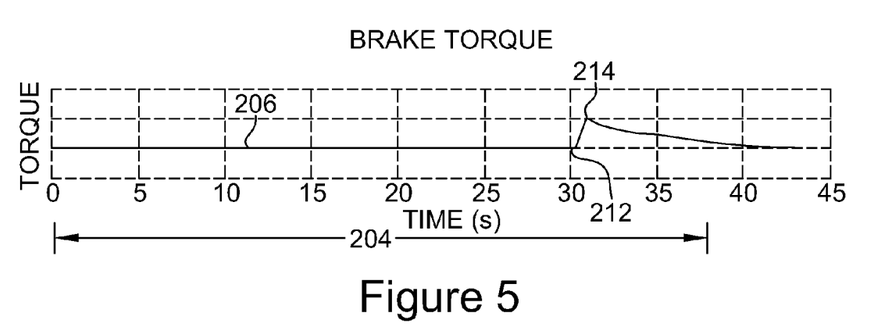
Figure 6:
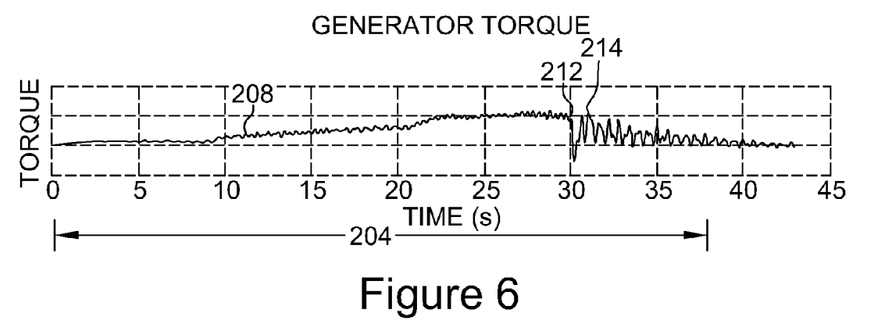
Figure 7:
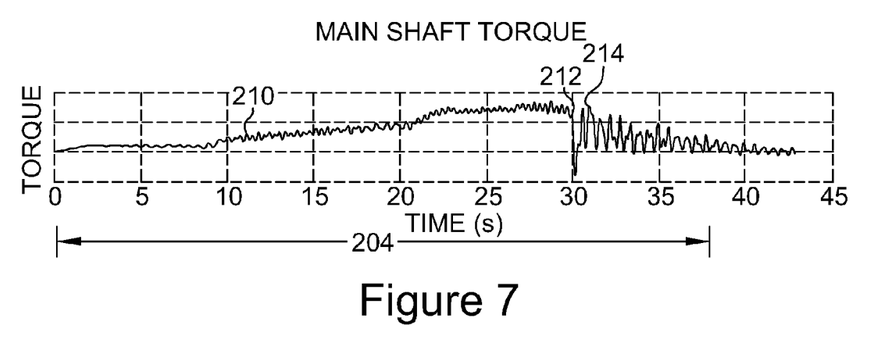

FIGS. 5-7 are exemplary graphs that show operating characteristics of wind turbine 10 during implementation of method 100. In the exemplary embodiment, FIG. 5 shows a brake torque 206 exerted by brake system 52 over a period of time 204. In the exemplary embodiment, brake system 52 is applied at a first time 212 to decrease a speed of rotation of rotor shaft 36 and/or generator rotor shaft 38. More specifically, in the exemplary embodiment, brake caliper 56 applies a force onto brake disc 54 at first time 212 to decrease a rotation of brake disc 54, thereby decreasing the speed of rotation of rotor shaft 36 and/or generator rotor shaft 38. In the exemplary embodiment, brake torque 206 increases after first time 212 until a maximum brake torque is exerted at a second time 214. More specifically, in the exemplary embodiment, brake torque 206 has a high positive slope between first time 212 and second time 214. Alternatively, brake torque 206 may have a low positive slope between first time 212 and second time 214.

In the exemplary embodiment, brake system 52 and, more specifically, brake caliper 56 is controlled to decrease the force applied by brake caliper 56 based on detected parameters such that the force does not load drivetrain 40 with a force greater than required to decrease the speed of rotation of rotor shaft 36 and/or generator rotor shaft 38. In the exemplary embodiment, brake system 52 and, more specifically, brake caliper 56 is controlled to decrease brake torque 206 after second time 214. More specifically, in the exemplary embodiment, brake torque 206 has a low negative slope after second time 214. Alternatively, brake torque 206 may have a high negative slope after second time 214.

FIG. 6 shows a torque 208 exerted by rotor shaft 36 over period of time 204. FIG. 7 shows a torque 210 exerted by generator rotor shaft 38 over period of time 204. As shown in FIGS. 5-7, there is a relationship between brake torque 206 and generator torque 208 and/or main shaft torque 210. More specifically, in the exemplary embodiment, when brake system 52 is applied at first time 212, generator torque 208 and/or main shaft torque 210 are disrupted. Moreover, in the exemplary embodiment, generator torque 208 and/or main shaft torque 210 decrease as brake torque 206 decreases after second time 214. The exertion of less generator torque 208 and/or main shaft torque 210 creates less strain and/or stress on drivetrain 40, gearbox 42, and/or wind turbine 10, thereby increasing a useful life for drivetrain 40, gearbox 42, and/or wind turbine 10.

The methods and systems described herein provide a mechanical brake system, including a brake caliper and a brake disc, and a controller coupled to the brake system. The brake system is controlled to exert a variable brake torque to reduce a load on a drivetrain. More specifically, the variable brake torque decreases over a period of time that the brake caliper applies a force onto a brake disc. By decreasing the brake torque over the period of time the brake system is applied, a generator torque and/or a main shaft torque is reduced, thereby increasing a useful life for the drivetrain, gearbox, and/or wind turbine.

Technical effects of the methods, systems, and computers described herein include at least one of: (a) receiving a signal that a mechanical brake is applied; (b) detecting a parameter from a sensor; and (c) controlling the mechanical brake to adjust a brake torque based on the parameter detected by the sensor.

Exemplary embodiments of the brake system and methods for operating the brake system are described above in detail. The methods and systems are not limited to the specific embodiments described herein, but rather, components of the systems and steps of the methods may be utilized independently and separately from other components and/or steps described herein. For example, the methods and systems described herein may have other industrial and/or consumer applications and are not limited to practice with wind turbines as described herein. Rather, one or more embodiments described herein may be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a rotational speed of a drivetrain for a wind turbine, the drivetrain coupled to a rotor shaft and a generator rotor shaft, said method comprising:
   operatively coupling a mechanical brake to the drivetrain, the mechanical brake including a brake caliper and a brake disc coupled to the drivetrain;
   detecting a parameter of the wind turbine;
   determining an operating command based on the parameter; and,
   controlling the mechanical brake based on the operating command, wherein the operating command facilitates actuating the brake caliper to apply a braking force on the brake disc such that a brake torque exerted by the brake system generally increases for a predetermined time period and generally decreases after the predetermined time period.

2. A method in accordance with claim 1, wherein detecting a parameter further comprises continuously detecting a dynamic parameter of the wind turbine, wherein determining an operating command further comprises continuously determining a dynamic operating command based on the dynamic parameter, and controlling the mechanical brake further comprises continuously controlling the mechanical brake based on the dynamic operating command.

3. A method in accordance with claim 1, further comprising:
   coupling a first valve and a second valve to the mechanical brake; and,
   actuating at least one of the first valve and the second valve to control the mechanical brake.

4. A method in accordance with claim 1, wherein determining an operating command further comprises determining a first operating command for a gross control of the brake system and a second operating command for a fine control of the brake system, and wherein controlling the mechanical brake further comprises controlling the mechanical brake based on at least one of the first operating command and the second operating command.

5. A method in accordance with claim 1, wherein controlling the mechanical brake further comprises:
   actuating the brake caliper to apply a first braking force on the brake disc such that a first brake torque is exerted by the brake system; and,
   adjusting the brake caliper to apply a second braking force on the brake disc such that a second brake torque is exerted by the brake system, the second brake torque less than the first brake torque.

6. A method in accordance with claim 1, wherein detecting a parameter further comprises detecting at least one of a shaft parameter, a wind turbine parameter, and an ambient environment parameter.

7. A brake system for controlling a rotational speed of a drivetrain for a wind turbine, the drivetrain coupled to a rotor shaft and a generator rotor shaft, said brake system comprising:
   a mechanical brake operatively coupled to the drivetrain, said mechanical brake comprising a brake caliper and a brake disc coupled to the drivetrain;
   a sensor configured to detect a parameter of the wind turbine; and,
   a controller configured to actuate the brake caliper to apply a braking force on the brake disc, said controller configured to control the mechanical brake based on the parameter such that a brake torque exerted by said brake system generally increases for a predetermined time period and generally decreases after the predetermined time period.

8. A brake system in accordance with claim 7, wherein said sensor is configured to continuously detect a dynamic parameter of the wind turbine, and said controller is configured to continuously control said mechanical brake based on the dynamic parameter.

9. A brake system in accordance with claim 7, further comprising a first valve and a second valve each coupled to said mechanical brake, wherein said controller is configured to actuate one of said first valve and said second valve to control said mechanical brake based on the parameter.

10. A brake system in accordance with claim 7, wherein said controller is configured to determine an operating command based on the parameter, and control said mechanical brake based on the operating command.

11. A brake system in accordance with claim 10, wherein said controller is configured to determine a first operating command for a gross control of the brake system and a second operating command for a fine control of the brake system, and control said mechanical brake based on at least one of the first operating command and the second operating command.

12. A brake system in accordance with claim 7, wherein said mechanical brake is configured to generate an initial brake torque, and said controller is configured to control said mechanical brake to generate a subsequent brake torque that is less than the initial brake torque.

13. A brake system in accordance with claim 7, wherein the parameter includes at least one of a shaft parameter, a wind turbine parameter, and an ambient environment parameter.

14. A wind turbine, comprising:
   a rotor;
   a drivetrain;
   a rotor shaft coupling said rotor to said drivetrain;
   a generator;
   a generator rotor shaft coupling said generator to said drivetrain;

a mechanical brake operatively coupled to said drivetrain, said mechanical brake comprising a brake caliper and a brake disc coupled to said drivetrain;

a sensor configured to detect a parameter of said wind turbine; and, a controller configured to control a rotational speed of said drivetrain, said controller configured to actuate said brake caliper to apply a braking force on said brake disc, said controller configured to control said mechanical brake based on the parameter such that a brake torque exerted by said brake system generally increases for a predetermined time period and generally decreases after the predetermined time period.

15. A wind turbine in accordance with claim 14, wherein said sensor is configured to continuously detect a dynamic parameter of said wind turbine, and said controller is configured to continuously control said mechanical brake based on the dynamic parameter.

16. A wind turbine in accordance with claim 14, further comprising a first valve and a second valve each coupled to said mechanical brake, wherein said controller is configured to actuate one of said first valve and said second valve to control said mechanical brake based on the parameter.

17. A wind turbine in accordance with claim 14, wherein said controller is configured to determine an operating command based on the parameter, and control said mechanical brake based on the operating command.

18. A wind turbine in accordance with claim 17, wherein said controller is configured to determine a first operating command for a gross control of the brake system and a second operating command for a fine control of the brake system, and control said mechanical brake based on at least one of the first operating command and the second operating command.

19. A wind turbine in accordance with claim 17, wherein said mechanical brake is configured to generate an initial brake torque, and said controller is configured to control said mechanical brake to generate a subsequent brake torque that is less than the initial brake torque.

20. A wind turbine in accordance with claim 14, wherein the parameter includes at least one of a shaft parameter, a wind turbine parameter, and an ambient environment parameter.

* * * * *